Sept. 13, 1927.
W. J. DALY
1,642,409
AXLE AND DRIVING WHEEL FOR LOCOMOTIVES
Filed July 8, 1927
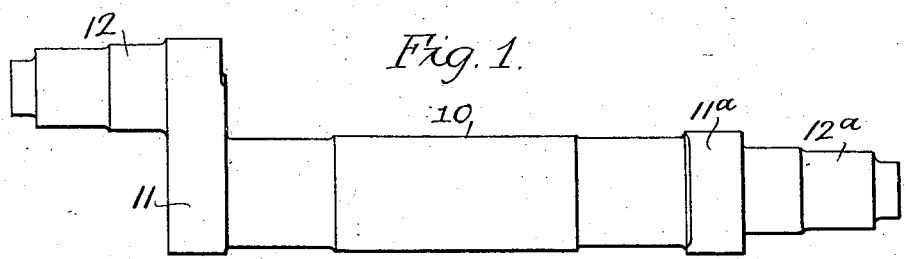
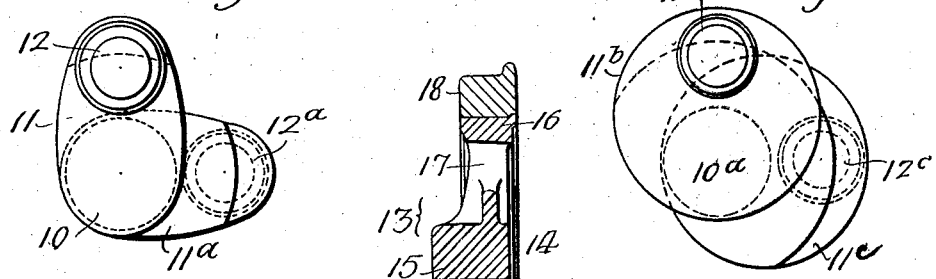
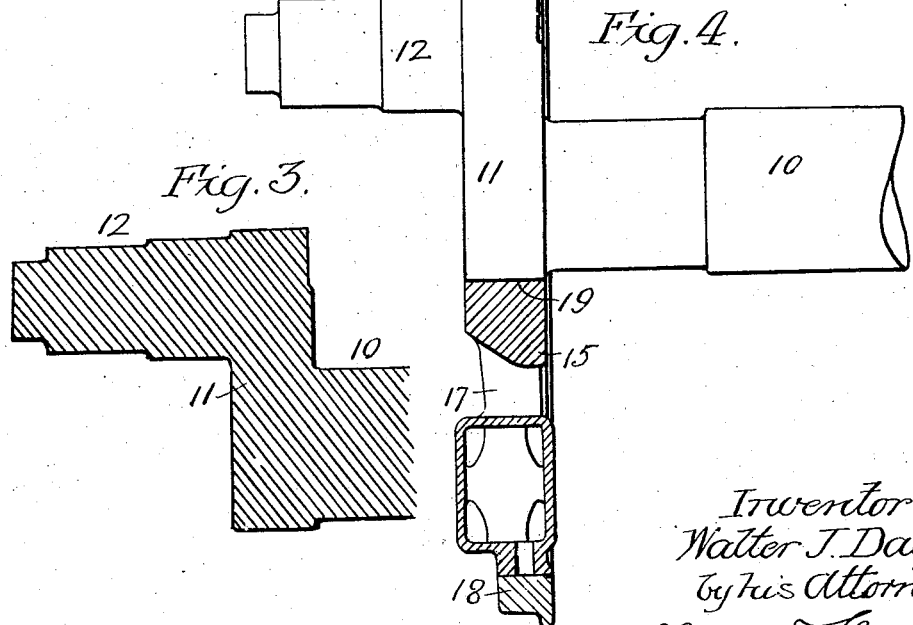
Inventor:
Walter J. Daly
by his Attorneys
Howson Howson Patented Sept. 13, 1927.

1,642,409

UNITED STATES PATENT OFFICE.

WALTER J. DALY, OF CONSHOHOCKEN, PENNSYLVANIA.

AXLE AND DRIVING WHEEL FOR LOCOMOTIVES.

Application filed July 8, 1927. Serial No. 204,282.

My invention relates to certain improvements in the driving axles and wheels of locomotives, and particularly the main driving wheel, although it will be understood that it can be applied to other wheels which are mounted on axles and which have driving pins.

The object of my invention is to make the pin and axle integral with hubs which are driven into openings in the wheel centre and which form part of the wheel.

In the accompanying drawing:

Fig. 1 is a side view of a driving axle illustrating my invention;

Fig. 2 is an end view of the axle shown in Fig. 1;

Fig. 3 is an enlarged sectional view of a portion of one end of the axle, showing the integral pin;

Fig. 4 is a sectional view of a driving wheel showing the axle in position within the opening in the wheel; and Fig. 5 is a view illustrating a modification of the axle.

10 is the driving axle of a locomotive having hub sections 11—11ª at each end, which are integral with the axle, and projecting from the hub sections are the pins 12—12ª which are integral with the hub sections. The hub sections 11—11ª are, in the present instance, arranged at right angles to each other, but the angle may vary according to circumstances.

13 is one of the driving wheels of a locomotive having a centre 14 in which is a hub 15 connected to the rim 16 by spokes 17 in the present instance, while on the rim is the usual tire 18. The particular construction of the wheel may be varied if desired.

The hub sections 11—11ª of the axle are oblong and curved at the sides as clearly shown in Fig. 2, and the opening 19 in each wheel centre corresponds in shape to that of the hub section of the axle, so that when the wheel centre is driven on the hub sections 11—11ª of the axle 10, the axle cannot turn independently of the wheel, owing to the shape of the hub sections 11—11ª.

In some instances the hub sections may be round as shown in Fig. 5, fitting the corresponding openings in the wheel centers. In this case it is preferable to provide keys for securing the wheel centers to the hub sections of the axle, although each wheel centre has a driven-fit on the axle.

In Figs. 5, 11ᵇ and 11ᶜ are the two hub sections of the axle 10ª, and 12ᵇ and 12ᶜ are the integral driving pins.

The driving axle may be plain as shown or it may have one or more cranks, without departing from the main features of the invention.

I claim:

1. The combination of a driving axle having an integral hub section; a wheel mounted on the hub section of the axle, said hub section having an integral driving pin.

2. The combination of a driving axle for locomotives having integral hub sections adapted to openings in the driving wheels, and having driving pins forming an integral part of said hub sections.

3. The combination of an axle; hub sections at each end of the axle; driving pins projecting from the hub sections, the hub sections being arranged at an angle to one another so that the driving pins are at an angle; and driving wheels mounted on the hub sections of the axle.

4. The combination of a driving axle having integral oblong hub sections, one hub section being arranged at an angle to the other, said hub sections having integral driving pins projecting therefrom; and driving wheels having openings corresponding to the oblong hub sections of the axle so that the wheels can be driven on said hub sections.

WALTER J. DALY.